Oct. 3, 1961 P. J. CLARK, SR 3,002,764
EQUALIZING SHOCK ABSORBER
Filed April 13, 1959 2 Sheets-Sheet 1
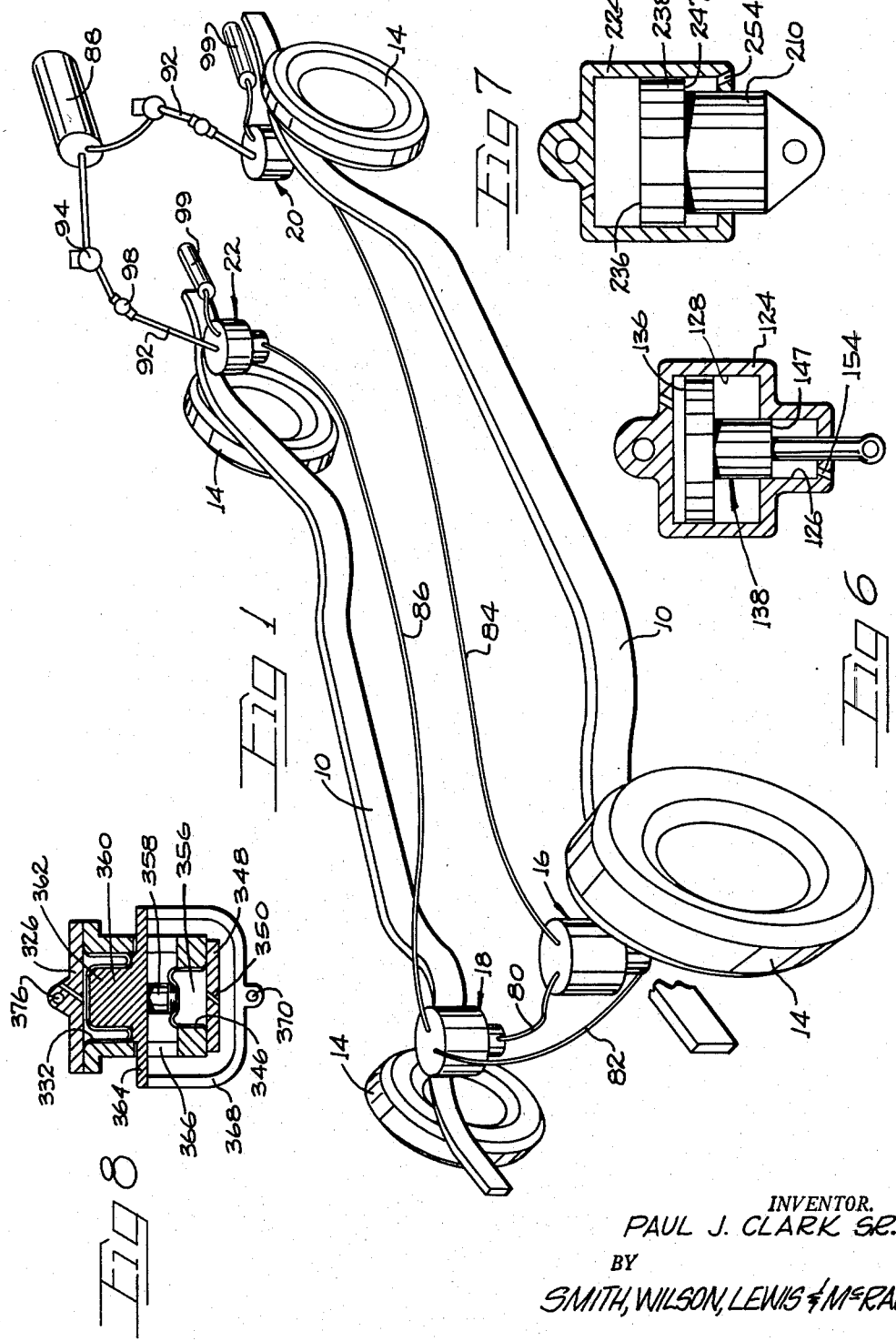
INVENTOR.
PAUL J. CLARK SR.
BY
SMITH, WILSON, LEWIS & McRAE

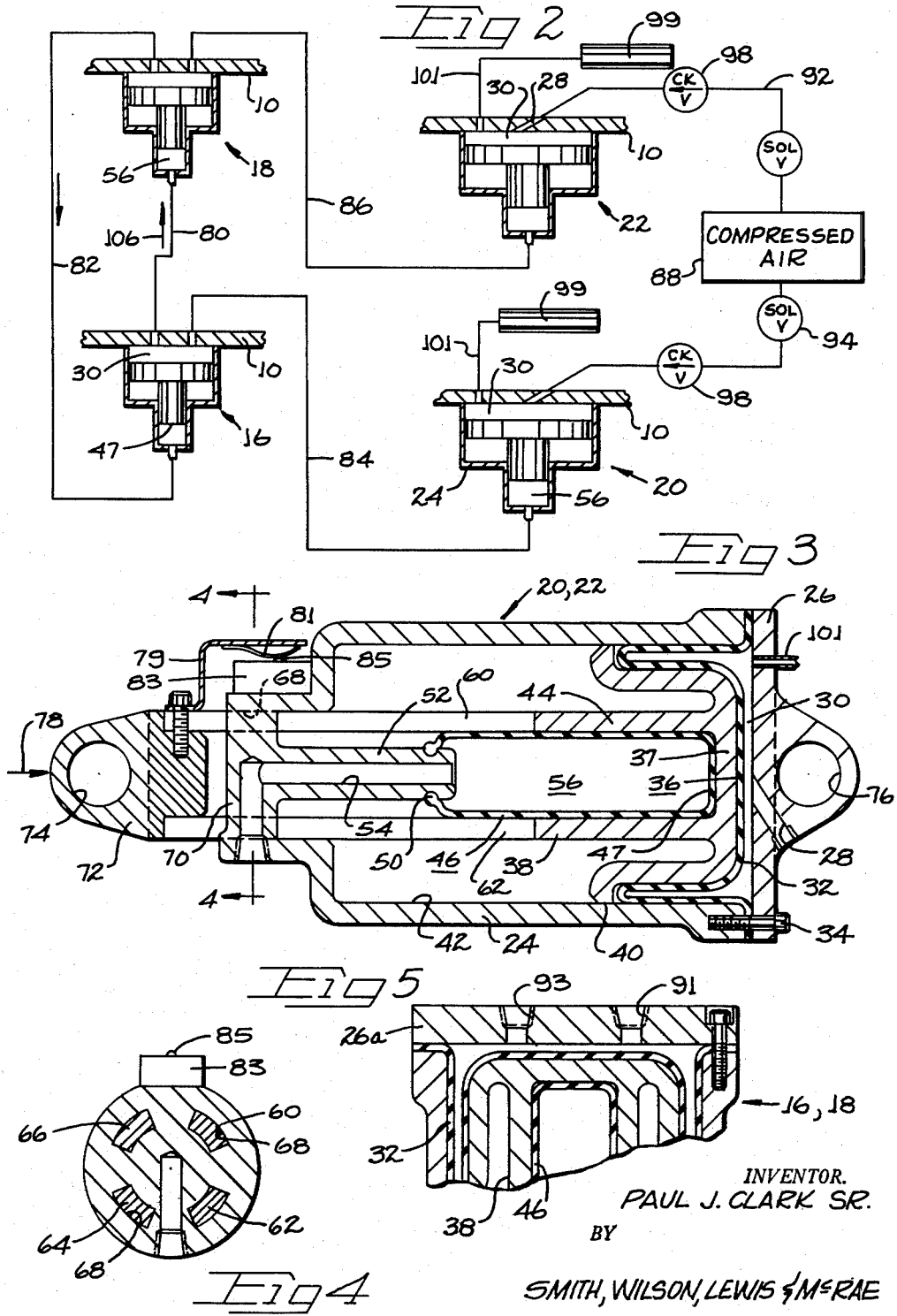

United States Patent Office 3,002,764
Patented Oct. 3, 1961

3,002,764
EQUALIZING SHOCK ABSORBER
Paul J. Clark, Sr., 300 Liberty St., Belleville, Mich.
Filed Apr. 13, 1959, Ser. No. 806,142
5 Claims. (Cl. 280—104)

This invention relates to a vehicle suspension system, and particularly to such a system having quick response to variation in road contour so as to provide a level ride under substantially all road conditions.

In the past few years air suspension devices have been developed for vehicles. However, such devices have not proven entirely satisfactory, due to such factors as high cost, leakage, requirement for high pressure fluids, and employment of complicated and costly valve devices for controlling the fluid flow into and out of the various suspension elements.

The present invention proposes a system having the principal "easy ride" characteristics of the conventional air suspension systems, while having the "low cost" advantages of the simpler types of suspension mechanisms. More specifically, the present invention proposes a low cost system wherein air or other compressible fluid can be utilized under pressure in conjunction with other non-compressible fluid to control the cushioning or anti-shock characteristics of the mechanism. Preferably the operable pressures are such that the system may be conveniently periodically recharged with air from a compressed air supply available in present-day gasoline service stations. The arrangement is such that the major portion of the air is stored separately from the operative portion at a somewhat higher pressure in a manner to automatically restore operative air pressure in the system on the occurrence of any air losses. Thus there is provided an automatic recharging system which has the effect of reducing the number of times which the motorist must receive air from the service station.

The invention is characterized by the fact that the individual vehicle suspension elements are very quickly responsive to variations in the road contour for localizing the effect of wheel displacement and maintaining a level ride. In operation each suspension device utilizes two fluid-engaged surfaces which are located to act in opposite directions of the vehicle frame. The fluid-engaged surface tending to raise the frame has a materially greater effective area than the fluid-engaged surface tending to lower the frame; as a result, any movement of the wheel relative to the frame sets up a comparatively large force on the motive fluids, said fluids thereby tending to quickly change the relative positions of the wheel and frame in a manner providing a substantially level ride, even when the vehicle is operated over rough or bumpy terrain.

From the above discussion, it will be seen that the invention has for its principal objects the provision of a vehicle suspension system having quick response to changes in terrain, low cost, long service life, and ability to employ relatively low pressure fluid for operational purposes.

Other objects of this invention will appear in the following description and appended claims, reference being had to the accompanying drawings forming a part of this specification wherein like reference characters designate corresponding parts in the several views.

In the drawings:

FIGURE 1 is a perspective view showing a conventional automotive vehicle frame and axle arrangement having an embodiment of the invention incorporated thereon.

FIG. 2 is a diagrammatic view of the mechanisms in the FIG. 1 embodiment.

FIG. 3 is a sectional view taken through a suspension device employed in the FIG. 1 embodiment.

FIG. 4 is a sectional view on line 4—4 in FIG. 3.

FIG. 5 is a sectional view showing a second suspension device employed in the FIG. 1 embodiment.

FIG. 6 is a sectional view on a reduced scale illustrating a type of suspension device which may be employed in place of the FIGS. 3 and 5 devices in the FIG. 1 embodiment.

FIG. 7 is a sectional view of another type of suspension device which could be employed in practice of the invention.

FIG. 8 is a sectional view through still another type of suspension device which may be employed in the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings there is shown parts of a conventional automotive frame 10 having portions overlying the conventional axles for the road-engaging wheels 14. Positioned between each axle and the adjacent portion of frame 10 are vehicle suspension devices 16, 18, 20 and 22. The various suspension devices are connected by fluid lines so that a shock load set up in one device is transmitted to the other device for insuring a substantially level ride irrespective of variations in road contour.

Suspension devices 20 and 22 may be constructed substantially as shown in FIG. 3. Thus, the FIG. 3 structure includes a casing element 24 having an open end closed by cover or head 26, said cover having an inlet-outlet opening 28 for alternate introduction and escape of pressure transmitting fluid such as air into and out of the space 30 defined by the flexible diaphragm element 32. It will be understood that the peripheral portions of the flexible element are clamped between opposed face portions of casing 24 and cover 26 by means of machine screws 34, the arrangement being such that the central portion 36 of the flexible element is carried on the enlarged head portion 37 of plunger element 38. Head portion 37 is provided with a peripheral edge portion 40 adapted to slidably engage the inner surface 42 of casing element 24. The central portion of plunger element 38 includes a hollow portion 44, in which is received a collapsible envelope 46 sealingly carried at 50 on the projecting wall portion 52 of casing element 24. Wall portion 52 is provided with a fluid flow opening 54 for the entrance and escape of pressure fluid into and out of the space 56 within envelope 46.

Plunger 38 is provided with four axially extending struts 60, 62, 64 and 66 which extend through slots 68 in the end wall 70 of casing structure 24. In this manner the plunger is supported for slidable movement at the spaced points 40 and 68. The ends of the struts are connected together by a head element 72 which may be provided with a through hole 74 for attachment of the plunger onto the vehicle axle or other structure carried thereby. The cover element 26 may also be provided with an opening at 76 for attachment of the casing structure 24 onto the vehicle frame.

Plunger 38 and casing 24 are preferably provided with automatic means for introducing pressure fluid into the space 30 when the plunger nears the conclusion of its stroke in the arrow 78 direction. Thus, for example, plunger 38 may be provided with an arm 79 which mounts a deflectable leaf element 81, and casing 24 is provided with a conventional switch structure 83 having an actuator 85. Switch structure 83 is electrically connected with the solenoid of conventional solenoid valve 94 in such manner that as plunger 38 nears the limit of its stroke in the arrow 78 direction the solenoid is energized to open the valve and admit pressure fluid from source 88 into space 30. The plunger is thereby driven in the opposite direction, which de-energizes the switch and closes the valve in a manner to maintain a desired pressure in space 30.

The suspension devices at 16 and 18 may be structurally similar to those shown in FIG. 3. However, devices 16 and 18 are preferably of smaller capacities than the devices at 20 and 22, as indicated by the relative sizes of the elements in diagrammatic FIG. 2. In the diagrammatic view the plunger is represented as a multi-diameter piston for clarity of illustration. However, it will be understood that in practice the sealed flexible element structures 32 and 46 will be preferably employed in preference to the piston structures to avoid the disadvantages resulting from leakage past the piston surfaces.

Each of the devices 16 and 18 is required to exchange fluid with adjacent devices as shown in FIG. 2, and accordingly the heads 26a, FIG. 5, for suspension devices 16 and 18 are provided with two inlet-outlet openings 91 and 93. Also, devices 16 and 18 are not provided with switch structures corresponding to switch structures 79, 83. In other respects the construction of devices 16 and 18 may be similar to the construction of devices 20 and 22. The various suspension devices are interconnected by fluid lines as shown in FIG. 2. Thus, the larger space 30 within suspension device 16 is connected with the smaller chamber 56 in suspension device 18 by means of fluid line 80, and the larger chamber 30 in suspension device 18 is connected with the smaller chamber 56 in suspension device 16 by means of fluid line 82. The larger chamber 30 in device 16 is also connected to the smaller space 56 in the device 20 by means of a fluid line 84, and the larger chamber 30 in suspension device 18 is connected to the smaller chamber 56 in suspension device 22 by means of a fluid line 86.

The suspension devices 20 and 22 are fed with compressible fluid, as for example, compressed air, from storage tank 88, said storage tank having a pair of lines 92 which lead through solenoid valves 94 and check valves 98 into the respective chambers 30 of the two rear suspension devices. As previously noted opening and closing of valves 94 is controlled by the switches 83, said switches being opened and closed by movement of the plungers 38 as previously described.

During the stroke of the plunger in each of the suspension devices 20 and 22 the check valves 98 prevent any exhaustion of fluid from chambers 30 back toward tank 88. In order to permit a full stroke of the plunger it is desirable that a device be provided for receiving fluid from each chamber 30; otherwise the chamber 30 fluid may offer such resistance to plunger movement as to prevent a full stroke. In the illustrated embodiment there are provided two relief chambers or tanks 99 connected with respective ones of the chambers 30 by lines 101. Chambers 99 thus act to receive fluid from chambers 30 during movement of the plungers toward members 26; in this manner the plungers are enabled to have full strokes when necessary.

The system defined by the front suspension units 16 and 18 and the spaces 56 in the suspension devices 20 and 22, is charged with oil or other substantially incompressible fluid. Spaces 30 in the suspension devices 20 and 22 are supplied with compressible fluid from tank 88, the arrangement being such that when plunger 38 in each of the suspension devices 20 and 22 approaches the cover element 26 switches 83 are actuated to open the valves 94 for allowing fluid from tank 88 to be fed into the rear spaces 30 in a manner to cause relative movement between the plunger and casing structure 24 for developing an air cushion in each of the spaces 30 of the suspension devices 20 and 22. As a result the fluid in lines 84 and 86 is put under pressure for maintaining the position of the plungers in the suspension devices 16 and 18. Preferably the charging of oil into the suspension devices 16 and 18 is carried out with the plungers in an intermediate position relative to the casing structures, so that the plungers may in operation have relative movement upwardly and downwardly with respect to their cooperating casing structures.

During operation if any of the wheels should encounter a rough spot in the subjacent terrain, as for example a bump or a depression in the road surface, there will be a movement of the respective plunger without any substantial movement of the cooperating casing structure. The improved action is obtained by reason of the unequal effective areas presented by elements 36 and 46.

As an illustration, if we assume that each of the suspension devices 16 and 18 is constructed to have effective surface areas 36 of seven square inches and effective surface areas 47 of 2.4 square inches, and that the load on each axle is approximately nine hundred pounds, then during normal riding the pressure in the suspension devices 16 and 18 is approximately one hundred ninety p.s.i. The force on each surface 36 of the two front suspension devices will be approximately one thousand three hundred thirty pounds and the force on each surface 47 in the front suspension devices will be approximately four hundred fifty-six pounds. When the front wheel strikes a bump the surface 36 thereby develops an effective force differential of at least approximately eight hundred seventy-four pounds (the difference between its force and the force on surface 47). This eight hundred seventy-four pound force differential is effective to very quickly pump oil from space 30 in the device 16, but the resistance offered by the eight hundred seventy-four pound force differential in the right front suspension device is effective to completely or wholly prevent any relative movement between plunger 38 in the suspension device 18 and its cooperating casing structure. In practice the eight hundred seventy-four pound force differential is transmitted through line 84 as well as line 80, so that the left rear suspension device is subjected to the force of the shock. Also, the lines 82 and 86 serve to put the right rear suspension device 22 in pressure transmitting relation to the road shock. As a result, there may be a very slight movement of the casing structures for suspension devices 18, 20 and 22 when the left front suspension device 16 encounters a road shock. However, the extreme force differential provided by the different effective areas of surfaces 47 and 36 serves to quickly pump fluid from device 16 into the other three suspension devices so as to maintain the frame on even keel. The above action is also obtained when any of the other wheels 14 engages a bump or depression.

It is realized that applicant is not the first to disclose separate suspension devices interconnected by fluid lines for transmitting shock from one wheel suspension device to other suspension devices. However, in the prior art arrangement the individual pistons are usually substantially of the same cross-sectional area. As a result, the effective pumping pressure obtained when a vehicle wheel hits a bump or depression is not nearly as large as the effective pumping pressure obtained with the present arrangement wherein the oppositely acting surfaces of the operating element 38 are of substantially different effective area. Therefore, the prior art arrangements are somewhat sluggish in operation, the action being such that when a particular wheel hits a bump the adjacent portion of the frame tends to rise to a certain extent before the pumping pressure can be effective to force the liquid out of the space above the piston. In applicant's arrangement the pumping pressures are such that relative movement of the piston to the associated casing structure is substantially instantaneous, with a resultant improvement in "level ride" characteristics.

It has been previously pointed out that in the present invention when the left front wheel strikes a bump the force developed by the associated plunger surface 36 is transmitted to line 84 as well as line 80. It is desirable therefore that the left rear suspension device 20 be so dimensioned that the resistance of its casing structure 24 to downward deflection by the pressure in line 84 be substantially the same as the resistance offered by the casing structure for the suspension device 18; otherwise, when the left front wheel strikes a bump the left rear portion of the frame will tend to tilt relative to the right front portion. As previously noted, the rear units are purposely preferably designed to have substantially greater effective operating areas than the front suspension devices. Accordingly, when the front suspension devices are constructed with effective plunger areas at 36 and 47 of seven square inches and 2.4 square inches, respectively, then the rear suspension devices are preferably constructed with effective cross-sectional areas at 36 and 47 of twenty-eight square inches and 4.2 square inches, respectively. The pressure in space 30 of the rear suspension devices is preferably set at about 60 p.s.i., which causes a force of about 1700 pounds to be exerted on the plunger surface 36 in each rear suspension device. As previously noted, in the illustrative example the pressure in line 84 may be about 190 p.s.i., which provides an effective upward force component on surface 47 of each rear plunger of about eight hundred pounds. It will thus be seen that the force differential on each rear casing structure is approximately nine hundred pounds. (Seventeen hundred pounds up and eight hundred pounds down.) This nine hundred pound force differential corresponds substantially with the eight hundred seventy-four pound force differential existing in the right front suspension device 18. In this manner the three suspension devices at 18, 20 and 22 are enabled to substantially equally absorb the shock placed on the left front wheel suspension device 16 so as to preclude any substantial movement of the portions of the frame associated with these three wheels. The action is such that when the left front wheel strikes a bump a substantial pumping pressure is instantaneously developed for pumping fluid through lines 80 and 84. The pumping pressure is instantaneously transmitted to the other three suspension devices through the lines 80, 82, 84 and 86 in a manner to obtain minimum deflection of any one portion of the frame.

From the above description it will be seen that there has been provided an arrangement wherein comparatively low pressure air is utilized to cushion against road shock. The illustrated arrangement shows a single air storage tank 88 supplying the two rear suspension devices 20 and 22. This arrangement is particularly advantageous in that the casing structures and plunger structures for the two rear devices can serve as suspension devices and as air receiver pressure mechanisms. However, it will be appreciated that other arrangements can be employed. Thus, the "differential force" features of the invention can be employed in a construction wherein each of the suspension devices would be in fluid communication with an air storage chamber, said air storage chamber serving to cushionably react against the pressures developed by each unit during encounter thereof with road shocks.

FIG. 3 shows a suspension device construction which is particularly advantageous by reason of its "sealed, compact, jam-free" characteristics. However, it will be appreciated that various different constructions of the suspension device could be employed while obtaining advantageous results according to the invention. Thus, as shown in FIG. 6, the casing structure for each front or rear unit could be formed as an element 124 having the different bores at 126 and 128 for slidably engaging the different diameter portions on the plunger 138, said plunger having the different pressure surfaces at 136 and 147 for providing the "force differential" features.

Each suspension mechanism could also be constructed as shown in FIG. 7 with a casing structure 224 housing a plunger 238 having the different effective diameters at 236 and 247, it being noted that surface 247 is defined by a plunger portion 210 of substantial diameter. Thus, in a given installation the plunger 238 might be constructed with the enlarged head portion thereof having a diameter of three inches and the reduced portion 210 thereof having a diameter of about 2.4 inches.

The construction shown in FIG. 8 incorporates the "sealed" advantages of the FIG. 2 construction. However, in the FIG. 8 construction the envelope 46 is replaced by a diaphragm 346, said diaphragm being clamped at its outer peripheral margins by means of a cover element 348, said cover element having a flow opening 350 therein for introduction and escape of pressure fluid into and out of the space 356 within diaphragm 346. The central portion of diaphragm 346 is supported on the reduced portion 358 of plunger 360, said plunger having an enlarged diameter portion 362 engaging the central portion of a diaphragm 332 similar in shape to the diaphragm shown in FIG. 3. The plunger is provided with a pair of extensions 364, which extend through slots 366 in the casing structure to connection with yoke member 368, said yoke member having an opening 370 for attachment of the suspension device onto the axle or axle-carried portion of a vehicle. The cover plate 326 is provided with an opening 376 for mounting of the suspension device on the vehicle frame.

From the above description it will be appreciated that several variations of structure and arrangement may be resorted to without departing from the spirit of the invention as defined in the appended claims, the various structures shown in the drawings being for illustrative purposes.

I claim:
1. In a vehicle suspension system, the combination comprising two cooperating relatively movable members positioned between the vehicle frame and road-engaging elements; one of said members comprising a housing structure, and the other of said members comprising a plunger structure mounted for movement into and out of said housing structure; a diaphragm extending within and across one end portion of the housing structure and supported on an enlarged portion of the plunger; said plunger having a hollow portion of substantially less diameter than the portion thereof engaged with the diaphragm; said housing structure having a wall portion thereof located within the hollow portion of the plunger and having a flow aperture therethrough; a collapsible envelope carried by said wall portion and extending within the hollow portion of the plunger, whereby during the plunger stroke the chambers defined by the diaphragm and envelope are alternately enlarged and reduced, with the variation in volume of the diaphragm chamber being substantially greater than the variation in volume of the envelope chamber.

2. In a vehicle suspension system, the combination comprising two members positioned between the vehicle frame and road-engaging element; one of said members comprising a casing, and the other member comprising a hollow plunger; said hollow plunger having a collapsible envelope therein sealed to a wall portion of the casing, said wall portion having a flow aperture therethrough for the introduction and escape of fluid into and out of the envelope.

3. In a vehicle suspension system, the combination comprising two relatively movable members positioned between the vehicle frame and the road-engaging element; one of said members comprising a casing structure having a flexible member therein defining a first variable volume chamber; the other member comprising a plunger structure having a portion engaged with said flexible member to vary the chamber volume during its stroke; said casing structure having a second flexible member sealed thereto, and said plunger engaging said second flexible member so as to collapse one of the flexible elements while permitting the other flexible element to extend, and vice versa.

4. In a vehicle suspension system for a vehicle having a frame and road-engaging element, the combination comprising a suspension device including a pair of relatively movable support members positioned between the vehicle frame and road-engaging element to support the vehicle weight; said members cooperating with one another to define first and second variable volume incompressible fluid chambers, said second chamber having a larger volume than said first chamber, said chambers being arranged so that contraction of one effects an expansion of the other, and vice versa; including wall means defining a third variable volume fluid chamber of lesser volume than said second chamber and connected with the second chamber to receive fluid therefrom during its period of contraction, and compressible fluid force means opposing expansion of the third chamber so as to develop a vehicle-supporting fluid pressure within the first, second and third chambers.

5. The combination of claim 4 wherein the compressible fluid force means comprises a container having a compressed gas charged therewithin, wall means adjacent said third chamber defining a fourth variable volume chamber arranged so that expansion thereof effects a contraction of the third chamber, said fourth chamber having a volume greater than said third chamber, conduit means between the gas container and fourth chamber, and valve means in the conduit means, whereby opening of the valve means permits gas from the container to expand the fourth chamber for thereby developing the aforementioned fluid pressure in the first, second and third chambers.

References Cited in the file of this patent
UNITED STATES PATENTS

| | | |
|---|---|---|
| 1,647,518 | Hawley | Nov. 1, 1927 |
| 1,847,252 | Miller | Mar. 1, 1932 |
| 1,914,814 | Mercier | June 20, 1933 |
| 2,787,475 | Jackson | Apr. 2, 1957 |
| 2,882,068 | Faiver | Apr. 14, 1959 |

FOREIGN PATENTS

| | | |
|---|---|---|
| 363,811 | Great Britain | Dec. 31, 1931 |
| 601,731 | Great Britain | May 12, 1948 |

UNITED STATES PATENT OFFICE
CERTIFICATE OF CORRECTION

Patent No. 3,002,764

October 3, 1961

Paul J. Clark, Sr.

It is hereby certified that error appears in the above numbered patent requiring correction and that the said Letters Patent should read as corrected below.

Column 4, line 61, after "arrangement" insert -- the opposite faces of --.

Signed and sealed this 3rd day of April 1962.

(SEAL)
Attest:

ERNEST W. SWIDER
Attesting Officer

DAVID L. LADD
Commissioner of Patents